L. COPPOCK.

DRAFT APPLIANCE FOR WAGONS AND THE LIKE.

APPLICATION FILED MAY 21, 1921.

Reissued Aug. 23, 1921.

15,180.

2 SHEETS—SHEET 1.

Witnesses:

W. P. Kilroy

Harry R. LeWhite

Inventor:

Lambert Coppock

By Ernest E. Dupont Atty.

L. COPPOCK.

DRAFT APPLIANCE FOR WAGONS AND THE LIKE.

APPLICATION FILED MAY 21, 1921.

Reissued Aug. 23, 1921.

15,180.

2 SHEETS—SHEET 2.

Witnesses:
W. P. Kilroy
Harry R. L. White

Inventor:
Lambert Coppock
By Ernest G. Dupee Attyy.

UNITED STATES PATENT OFFICE.

LAMBERT COPPOCK, OF LEBANON, OREGON.

DRAFT APPLIANCE FOR WAGONS AND THE LIKE.

15,180. Specification of Reissued Letters Patent. Reissued Aug. 23, 1921.

Original No. 1,342,254, dated June 1, 1920, Serial No. 157,694, filed March 27, 1917. Application for reissue filed May 21, 1921. Serial No. 471,497.

*To all whom it may concern:*

Be it known that I, LAMBERT COPPOCK, a citizen of the United States, and resident of Lebanon, in the county of Linn and State of Oregon, have invented certain new and useful Improvements in Draft Appliances for Wagons and the like, of which the following is a specification.

My invention relates to draft appliances for wagons, and the like. It is well known that a load standing still if slowly and gradually brought into motion or a load in motion if slowly and gradually brought to rest will require less pulling or braking power, as the case may be, to accomplish the desired result than if the pulling or braking power were applied suddenly and unevenly. It is also well known that the load and its supporting means and the instrumentalities furnishing the pulling or braking power will be subjected to less shock and strain when the pulling or braking power is applied slowly and gradually to the load than would be the case if the pulling or braking power were applied suddenly and unevenly. The primary object of my invention is to provide an improved draft appliance, in association with the load supporting frame of a vehicle, for example, a wagon, of such construction that a minimum amount of pulling or braking power will be required to bring about a change in the condition of rest or motion of the load, and whereby the shocks and strains, to which the load and its supporting means and the instrumentalities furnishing such power are subjected, when starting and stopping the load, will be reduced to a minimum.

My invention contemplates a load supporting frame, a draft bar positioned above the frame, and means adapted to make contact with the roadway and support the draft bar thereabove, for example, an axle and a pair of wheels on said axle, and a more specific object of my invention is to provide a connection between the frame and the draft bar, preferably a plurality of links each of which is pivotally connected at one end to the draft bar and at the other end to the frame, whereby the weight of the load tends to maintain the draft bar and links in normal position relative to the frame, that is to say, tends to maintain the links substantially vertical and the draft bar substantially parallel to the frame.

The invention consists in the novel constructions and arrangements to be hereinafter described and claimed for carrying out the above stated objects and such other objects as will appear from the following description of certain preferred embodiments thereof illustrated in the accompanying drawings, wherein—

Similar characters of references are employed in all of the views of the drawings to indicate corresponding parts.

Figure 1:
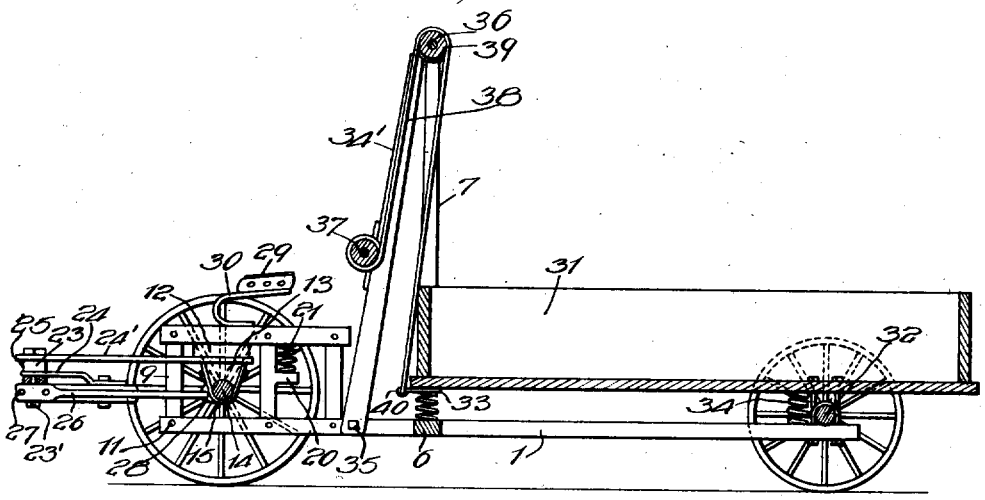
Figure 1 is a vertical longitudinal section through a wagon equipped with a draft appliance embodying the principles of my invention, and provided with a dumping body.
Figure 2:
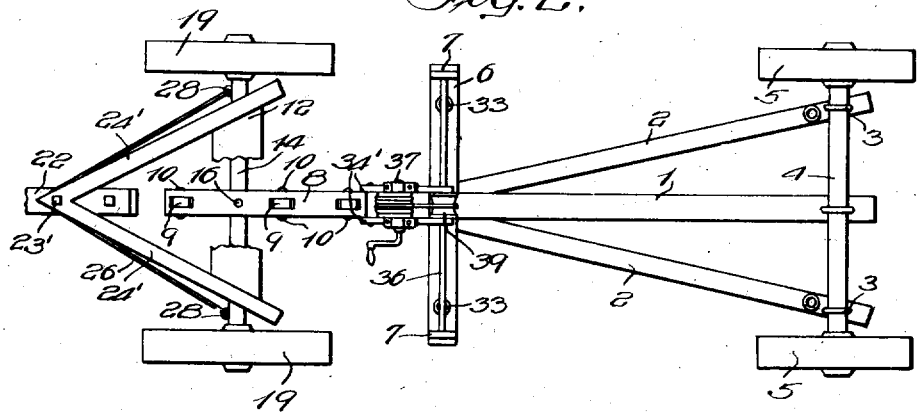
Fig. 2 is a top plan view of the wagon, the dumping body having been removed and certain parts being broken away to illustrate certain features more clearly.
Figure 3:
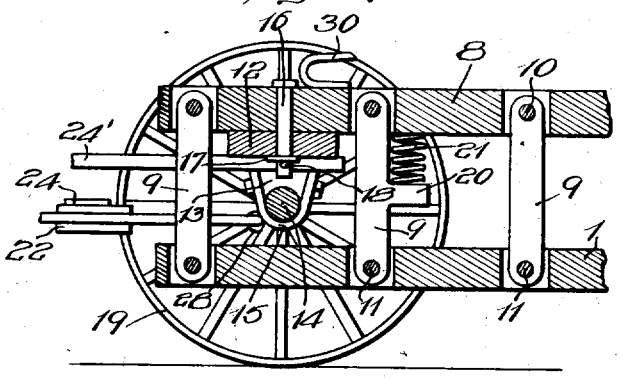
Fig. 3 is an enlarged vertical longitudinal section through the draft appliance.
Figure 4:
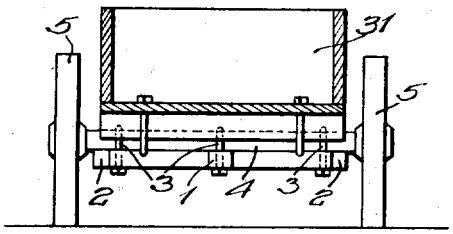
Fig. 4 is a rear elevation of the rear axle and its associated parts.

Referring to Figs. 1 to 4 of the drawings, it will be seen that the invention is illustrated as embodied in a wagon having a dumping body and provided with a load supporting frame comprising a central member or reach 1 having obliquely directed hounds 2 leading rearwardly from an intermediate point thereof. The rear axle is represented at 4 and is secured to the member 1 and the hounds 2 by suitable clips 3, with the rear carrier wheels 5 supported upon the journals of the axle in the usual manner.

A cross bar 6 may be arranged upon the member 1, adjacent the forward end to form a supporting member for the forward end of the load. Rising from the bar 6 near its ends are vertical members 7 which are connected at their upper ends by a transverse shaft 36, the latter having a cable guide pulley 39 intermediate the same. Near its center and adjacent to the sides of the pulley 39 are oblique standards 34′ connected at 35 to the reach 1 upon opposite sides.

Arranged above and spaced from the forward end of the reach member 1 is a longitudinally disposed draft bar 8, the said bar 8 being movably supported upon the reach member through the medium of one or more links indicated by the numeral 9, three of such links being shown in the drawings, the upper ends of which are passed through suitable openings in the longitudinally disposed draft bar and are pivotally connected thereto by passing bolts 10 or the like through the same into engagement with said upper ends. The lower ends of the links 9 are received in similar openings formed in the forward end of the reach member 1 and are in turn pivotally connected thereto by means of bolts 11 or the like which are passed through the said forward extremity of the reach member into engagement with the lower ends of the links. To the underside of the longitudinal bar 8 and in proximity to one extremity thereof, is affixed a transversely disposed axle supporting element 12, the same carrying upon its opposite end portions a plurality of axle bearings 13 to receive an axle 14, the said axle being secured in position by means of straps 15 which are passed about the lower portions of the axle and secured to the bearings 13 by passing suitable fastening devices through the straps and into engagement with the bearings. It may be here noted that the rear axle 4 is preferably mounted in its respective bearings 3 in a plane lower than the mounting of the axle 14, thus allowing an indirect pull to be imparted to rear axle 4 from the wheels mounted on the forward axle and tending to aid in reducing the starting draft to a minimum. A king bolt 16 is passed downwardly through an opening formed in the draft bar 8 and through a similar opening formed in the axle supporting element 12. The king bolt 16 is secured in position with relation to the draft bar and axle supporting element by means of a washer or bearing plate 17 arranged over the lower end of the king bolt and held firmly in position thereon through the medium of a cotter pin 18 which passes through the bolt. By so arranging the king bolt 16, it is obvious that the axle 14 may be readily turned and hence the wheels 19 carried upon the spindle portions thereof may be moved thereby when cramped to turn the wagon.

By the arrangement described a portion of the load, and in the specific embodiment shown a very considerable portion of the load, is borne by the forward portion of the load supporting frame. The weight of the load supporting frame and that portion of the load borne thereby is all transmitted indirectly to the draft bar 8 by means of the links 9. The tendency, therefore, is for the links 9 to be maintained normally in a vertical position. To aid in normally maintaining the supporting links 9 upon which the longitudinally disposed bar 8 is arranged in upright position with relation to the forward portion of the reach member 1, there may be formed upon one of said links a laterally offset portion 20, which portion seats the lower convolution of an expansible coiled spring 21, the upper convolution of the spring engaging the adjacent portion of the under face of the bar 8. Hence, when the links 9 are inclined with relation to the reach member 1 and the bar 8, the coiled spring 21 will be brought into action and will gradually aid in returning said links 9 to their normally upright positions as the strain thereupon diminishes or decreases.

Forwardly diverging hounds 24′ are connected at their rear ends between the member 12 and the bearings 13, and are connected at their forward ends to the draft tongue 22 by a spacer block 25 and tie bolt 23′. Obliquely directed ties or brace members 26 extend between the tongue 22 and the axle 14, to which they are coupled by eye bolts 28 or like devices. A locking nut of suitable construction is preferably applied to the bolt 23′, as indicated in Fig. 1.

A seat 29 is preferably arranged upon the upper face of the longitudinal bar 8 and supported thereon by a spring arm 30.

A dumping body 31 is pivotally supported upon the rear axle 4 and has the forward end of the same resting upon a plurality of expansible coiled springs 33 seated upon the opposite extremities of the cross bars 6. Springs 34 similar to the springs 33 are also arranged adjacent the pivotal mounting of the dumping body 31 and obviously serve to cushion the return of the body to normal position with relation to the wagon frame.

To provide means whereby the body 31 may be raised to discharge or dump the contents thereof, a plurality of spaced standards 34′ are secured to the forward portion of the reach bar 1 as at 35, preferably, upon the opposite sides of the reach bar and have the upper extremities thereof apertured to receive a transversely disposed shaft 36 mounted in suitable bearings formed in the upper extremities of the uprights 7. A windlass 37 is arranged upon the standards 34′ intermediate their ends and is provided with a cable 38, which cable extends upwardly over a pulley 39 mounted upon the shaft 36, thence downwardly into engagement with an arm 40 secured to the forward portion of the dumping body 31. By coiling the cable 38 about the windlass, the forward portion of the dumping body will be elevated, thereby allowing the contents of the same to be discharged or dumped. To return the body to its normal position upon the wagon frame, the windlass 37 is rotated in a reverse or counter direction and permits the body to gradually reseat upon the expansible coiled springs 33 and 34.

Figure 5:
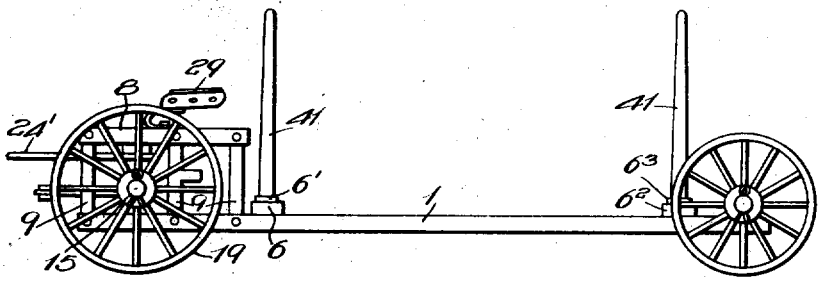
Fig. 5 is a side elevation of a log or lumber hauling wagon equipped with a draft appliance constructed according to my invention.

In Fig. 5 I have shown my invention as embodied in a wagon adapted to be used as a log or lumber hauling wagon, the dumping body 31 together with the uprights 7, the standards 34′ and the windlass 37 having been removed. Suitable sockets 6′ are formed in the opposite extremities of the cross bar 6 while a second cross bar $6^2$ is arranged adjacent the rear axle 4. The bar $6^2$ is supplied with sockets one of which is represented at $6^3$. Stakes 41 are supported in the sockets of the members 6 and 6′ to retain the load in position.

From the above, it will be obvious that a draft appliance of very simple construction is provided capable of adaptation to various types of vehicles, such as wagons, trailers, cars, and the like.

By means of the draft appliance herein disclosed the power is directly applied to the draft bar and indirectly applied, slowly, gradually and evenly to the load either when bringing the load into motion from a position of rest or when bringing a moving load into a condition of rest. The amount of pulling or braking power required for bringing about said respective changes is reduced to a minimum.

The arrangement shown, with the rear wheels smaller than the forward wheels also aids in lessening the draft since an indirect pull is imparted to the rear wheels which are mounted below the horizontal plane of the forward wheels.

Assuming the vehicle to be standing still it will be apparent that the weight of the load supporting frame and its load will cause the links 9 to assume substantially a vertical position. Regardless whether a forward pull is exerted on the draft bar or a backward thrust is applied thereto the links 9 under the weight of the load supporting frame and the load tend automatically to resist movement out of the vertical. In starting and stopping, the team, load and load supporting frame are not subjected to shocks, jars or strains because the operation is smooth, even and uniform.

I dot not intend to limit the invention to the constructions and arrangements herein shown and described, except only in so far as certain of the appended claims are specifically limited thereto, as it will be obvious to those skilled in the art that various modifications and changes may be made without departing from the principles of the invention.

I claim:

1. In a vehicle including a reach member and a forward axle, a draft appliance connected to the forward axle, a member rigidly connected to the forward axle and movably coupled to the reach member, and means operating to maintain the draft appliance in normal position relative to the reach member and yieldable under the forward pull of the draft power.

2. In a vehicle including a reach member and a forward axle, a draft appliance connected to the forward axle, a member rigidly connected to the forward axle, a plurality of links pivotally connected respectively to the rigidly connected member and to the reach, and a spring between one of said links and the rigidly connected member and operating to maintain the draft appliance in normal position relative to the supporting body and yieldable under the forward pull of the draft power.

3. In a vehicle including a reach member and a forward axle, a member directed transversely of the reach member and longitudinally of the axle and supported therefrom, diverging members connected to the transversely directed member, a draft tongue connected to the diverging members, a bar rigidly connected to the transverse member and longitudinally of the reach member, a plurality of links pivoted respectively to the bar and to the reach member, and yieldable means between the reach and the bar.

4. In a vehicle, a longitudinally directed reach member, a rear axle rigidly connected to the reach member, bearing wheels mounted on the rear axle, a forward axle, bearing wheels mounted on the forward axle, a draft appliance connected to the forward axle, a device rigidly connected to the forward axle, means for movably coupling said rigidly connected device to the reach member and operating to maintain the draft appliance in normal position relatively to the reach member and yieldable under the forward pull of the draft power.

5. In a vehicle, a longitudinally directed reach member, a rear axle rigidly connected to the reach member, bearing wheels mounted on the rear axle, a forward axle, bearing wheels mounted on the forward axle, a draft appliance connected to the forward axle, a device rigidly connected to the forward axle, a plurality of links pivotally connected respectively to the rigidly connected device and the reach member, and a spring coupling one of said links to the rigidly connected device and operating to maintain the rigid device and the forward axle carried thereby in normal position relatively to the reach member and yieldable under the forward pull of the draft power.

6. In a vehicle the combination of a draft bar, a load supporting frame swingingly suspended from the draft bar at a plurality of points, means adapted to make contact with the roadway and support the draft bar thereabove, means connecting the loading frame to the draft bar, said means normally tending to hang pendant under the weight of the loading frame and normally oscillating in a vertical plane under the draft bar stresses for the purpose described.

7. In a vehicle, the combination of a substantially horizontal draft bar, a load supporting frame swingingly suspended from said draft bar in substantially parallel relationship therewith, means adapted to make contact with the roadway and to support said draft bar thereabove, and a plurality of links each of which is pivotally connected at one end to said draft bar and at the other end to said frame, the weight of the load normally tending to maintain said links substantially vertically and the stresses in the draft bar normally causing said links to oscillate in a vertical plane for the purpose described.

8. In a vehicle, the combination of a draft bar, a load supporting frame swingingly suspended from the draft bar, an axle rigidly associated with said draft bar, a pair of wheels on said axle, and a plurality of links each of which is pivotally connected at one end to said draft bar and at the other end to said frame, the weight of the load normally tending to maintain said links substantially vertically and the stresses in the draft bar normally oscillating the said links in a vertical plane for the purpose described.

9. In a vehicle, the combination of a draft bar, a load supporting frame, one end of which is swingingly suspended from the draft bar, means adapted to make contact with the roadway and support said draft bar thereabove, means connecting the draft bar with the adjacent end of said frame, the said last mentioned means being adapted to hang pendant under the weight of the load supporting frame and to normally oscillate in a vertical plane under the stresses in the draft bar, and means adapted to make contact with the roadway and support the other end of said frame.

10. In a vehicle, the combination of a draft bar, a load supporting frame, one end of which is swingingly suspended from the draft bar, means adapted to make contact with the roadway and support said draft bar thereabove, a plurality of links each of which is pivotally connected at one end to said draft bar and at the other end to the adjacent end of said frame, and means adapted to make contact with the roadway and support the other end of said frame, the weight of the load normally tending to maintain said links substantially vertically and the stresses in the draft bar normally causing said links to oscillate in a vertical plane for the purpose described.

11. In a vehicle, the combination of a load supporting frame, a pair of axles transversely disposed with respect to said frame, one being positioned adjacent one end of said frame and the other being positioned adjacent the other end of said frame, wheels on said axles, a draft bar rigidly associated with one of said axles, means adapted to swingingly suspend the adjacent end of the frame from the draft bar, said means tending to hang pendant under the weight of the load supporting frame and oscillating in a vertical plane under the stresses in the draft bar, and means adapted to connect the other of said axles with the other end of said frame.

12. In a vehicle, the combination of a load supporting frame, a pair of axles transversely disposed with respect to said frame, one being positioned adjacent one end of said frame, and the other being positioned adjacent the other end of said frame, wheels on said axles, a draft bar rigidly associated with one of said axles, a plurality of links each of which is pivotally connected at one end to said draft bar and at the other end to the adjacent end of said frame, and means adapted to connect the other of said axles with the other end of said frame, whereby the weight of the load normally tends to maintain said axles a predetermined distance apart and said links substantially vertical.

13. In a vehicle the combination of a load supporting frame, a pair of axles transversely disposed with respect to said frame, one being positioned adjacent one end of said frame and the other being positioned adjacent the other end of said frame, wheels on said axles, a draft bar rigidly associated with one of the axles, a load supporting member mounted on the axle with which the draft bar is associated, a plurality of links each of which is pivotally connected at one end to the load supporting member and at the other end to the adjacent end of said frame and means adapted to connect the other of said axles with the other end of said frame whereby the weight of the load normally tends to maintain said axles a predetermined distance apart and said links substantially vertical.

14. In a vehicle the combination of a load supporting frame, a pair of axles transversely disposed with respect to said frame, one being positioned adjacent one end of said frame and the other being positioned adjacent the other end of said frame, wheels on said axles, a draft bar rigidly associated with one of the axles, a load supporting member connected to that end of the frame adjacent the draft bar, a plurality of links each of which is pivotally connected at one end to said draft bar and at the other end to said load supporting member, and means adapted to connect the other of said axles with the other end of said frame whereby the weight of the load normally tends to maintain said axles a predetermined distance apart and said links substantially vertical.

LAMBERT COPPOCK.